Nov. 6, 1934.  E. G. STRECKFUSS  1,979,848
MEAT SLICER
Filed July 31, 1930   3 Sheets-Sheet 1

Elmer G. Streckfuss INVENTOR.

BY

Allen & Allen ATTORNEY.

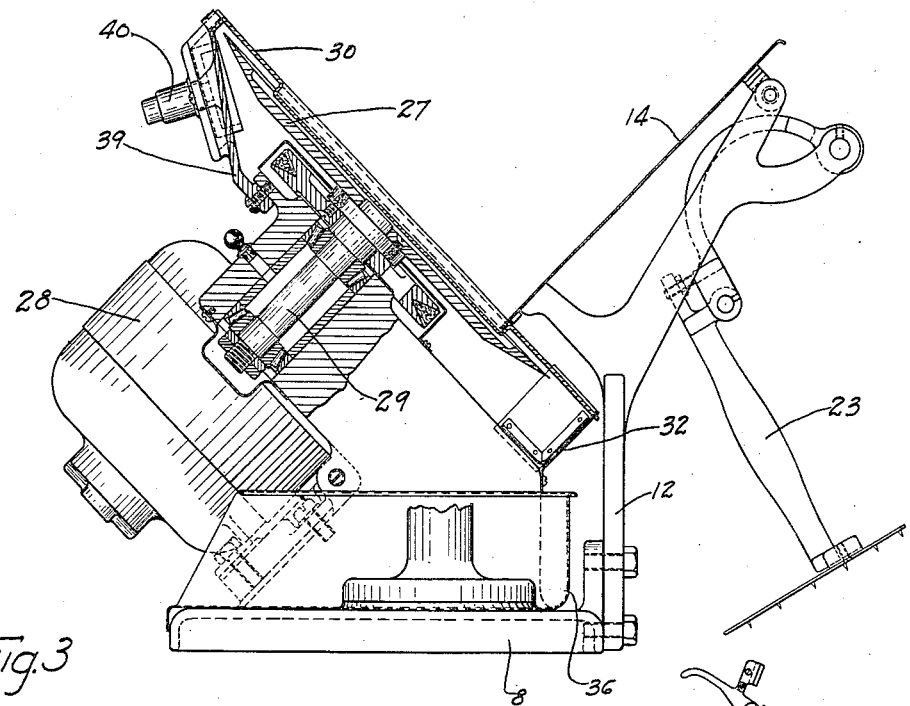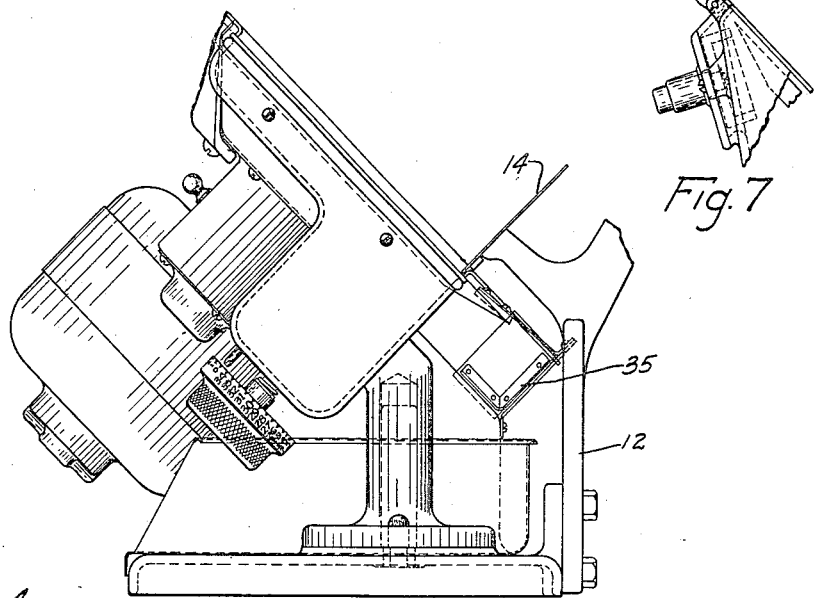

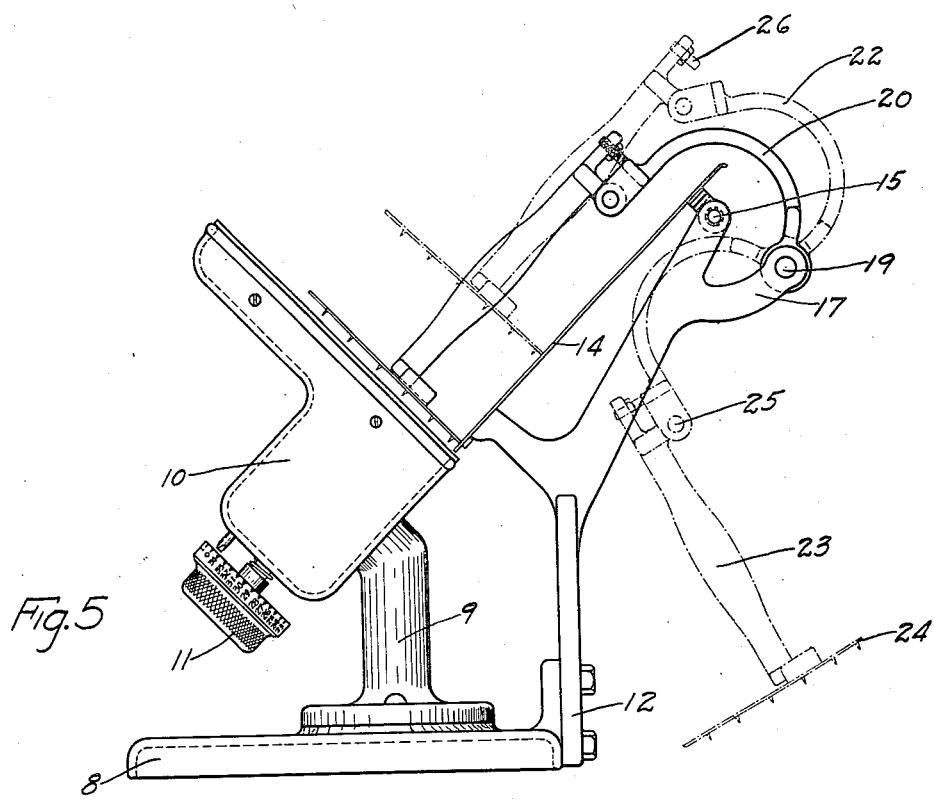
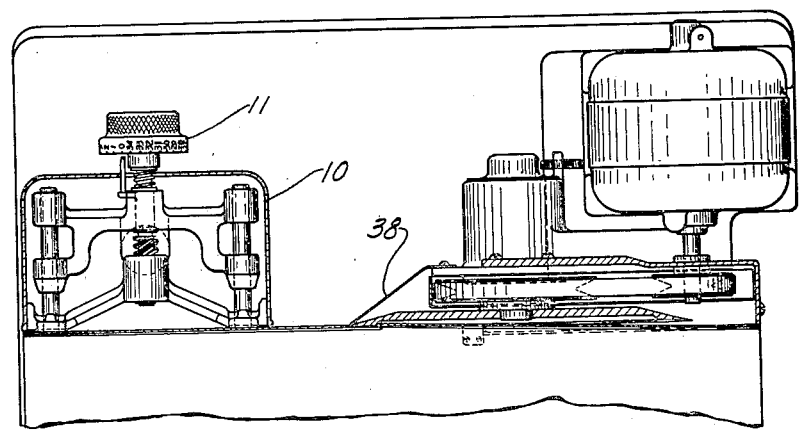

Patented Nov. 6, 1934

1,979,848

UNITED STATES PATENT OFFICE 1,979,848

MEAT SLICER

Elmer G. Streckfuss, Cincinnati, Ohio, assignor to The Cincinnati Time Recorder Company, Cincinnati, Ohio, a corporation of Ohio Application July 31, 1930, Serial No. 471,992

6 Claims. (Cl. 146—102)

My invention relates to slicers and particularly those adapted to meat slicing. My invention is best adapted for use on meat slicers of the type having a rotary knife revolving on a fixed axis.

Devices of this type previously constructed have been so designed as to be limited in the length of the slices possible. Where these devices have been constructed to handle material of any substantial length, it has been necessary to add long guide rods onto the device for the carriage to reciprocate over. This has produced a device which is both clumsy and expensive, and even with these added guide rods, it has not been possible to make very long cuts.

The principal object of my invention is to so construct a slicer as to permit taking of cuts of unlimited length. This is due principally to the fact that I have eliminated the heretofore movable carriage and have provided a fixed support over which the meat is moved by hand or otherwise. Consequently, it can be seen that slices of great length can be readily made without adding extra parts on to the device. Devices have been constructed somewhat similarly in the past, but in each instance no provision was made for guiding the meat during the time the cut is being made.

In my device the carriage is entirely eliminated and the guard plate for the knife and the gauge plate together form the support and guiding means for the meat. This eliminates extra parts, thereby enabling me to produce a device much more satisfactory than previous devices, and still at less cost. Since there are no moving parts, constant wear is avoided and the device will have a much longer effective life.

Another object of my invention is to so arrange the gauge plate, guard plate and knife with relation to each other, as to force the meat against the gauge plate, permitting a better cut with less pressure. This is accomplished by setting the knife in a plane parallel to the gauge plate and setting the guard plate at a slight angle in relation to the knife and gauge plate. Devices have previously been made in which it was attempted to accomplish this function, but in all of these the knife was set at an angle to the guage plate so that both the gauge plate and guard plate had to be bowed to follow the contour of the knife. This was not very practical because of the difficulty in bowing the plate originally and in keeping this shape during the enameling process. This was also disadvantageous in use because the cut in the meat was bowed in the same shape as the gauge plate and if the meat were turned and pushed past the knife on a different side, several slices were wasted. In my device the cuts are always made in a straight line and whichever way the meat is pushed past the knife a straight cut is made each time, consequently losing no material.

Another object of my invention is to provide the plate which forms a part of the support and guide for the meat in such a way that it may be swung out of normal position to expose the guard plate, knife and gauge plate for cleaning or repair.

Another object of my invention is to provide a device for gripping the meat when a cut is being taken close to the knife, which will travel along with the meat as the cut is being made. The gripping device is also hinged so that it can be swung out of the way when not being used.

In the particular embodiment of my invention selected for illustration:

Figure 3 is a partial elevation of one end of the device with the knife and adjacent parts shown in section.

Figure 4 is another partial elevation of the same end of the device.

Figure 5 is an elevation of the same end showing the meat gripping device in several of its positions.

Figure 6 is a sectional plan view on a plane perpendicular to the knife axis, showing the gauge plate adjusting means, knife and its operating means.

Figure 7 is a detail of the grinder for sharpening the knives.

Figure 1:
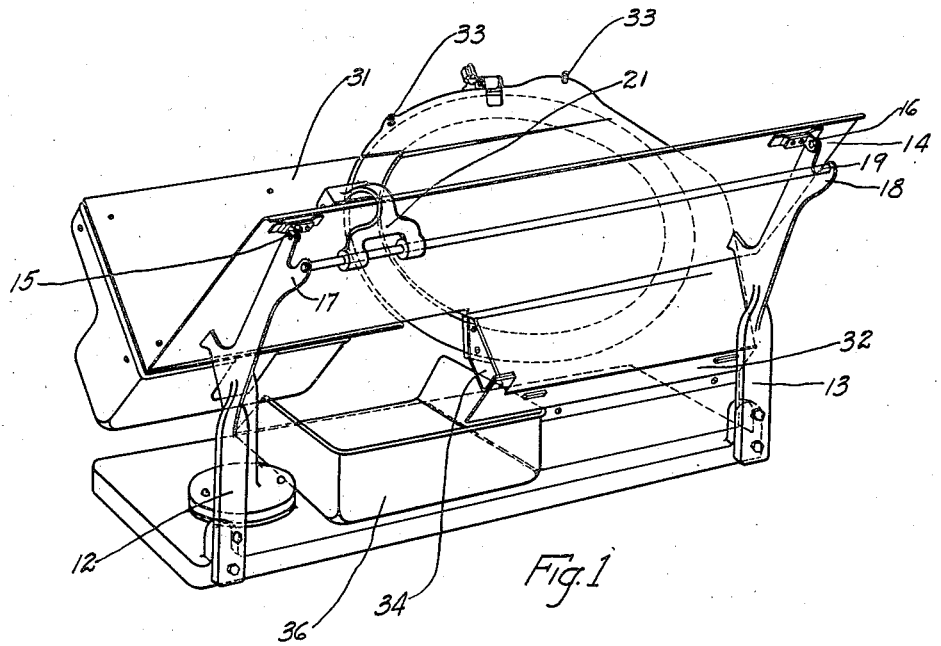
Figure 1 is a perspective of a meat slicer embodying my invention.
Figure 2:
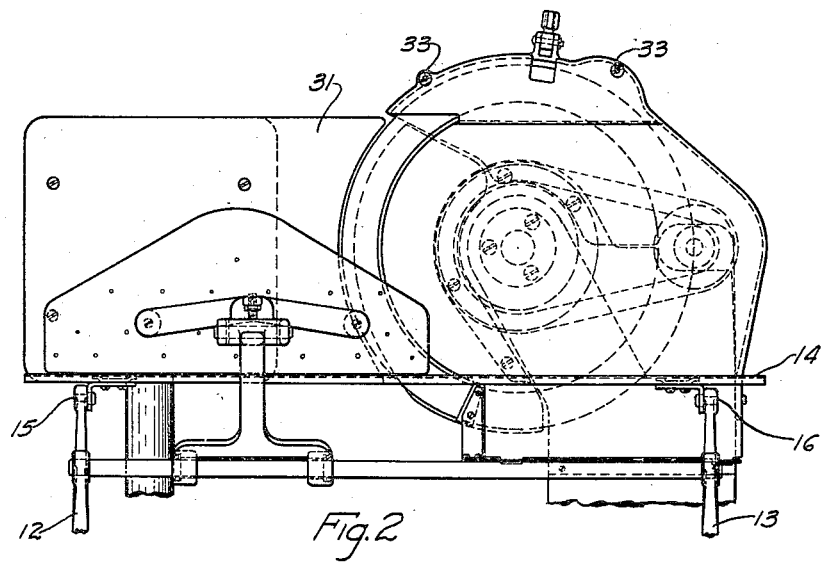
Figure 2 is a front elevation viewed on a line parallel to the axis of the knife.

Referring now to the drawings, the device comprises a base plate 8, to which a pedestal 9 is removably secured in any suitable manner. On the pedestal 9 is slidably mounted the housing 10 in which are the means for adjusting the gauge plate, indicated generally as 11. A pair of supports 12 and 13 are rigidly secured to the base 8 and at their upper portions carry the plate 14 on the hinges 15 and 16, so that the plate 14 may be swung upward and forward out of its normal position shown in Figure 1, to any desired degree so that the guard plate, gauge plate and knife may be exposed. On the ears 17 and 18, preferably formed integrally with the supports 12 and 13, respectively, is a fixed rod 19 on which the meat gripping device 20 slides. The meat gripping device comprises a bifurcated end 21 having an integral arcuate arm 22 to which the support 23 carrying the gripper 24 is pivoted at 25. The support 23 is provided on its outer end with a stop 26 which bears against the arm 22 when the gripper is almost in contact with the knife, preventing its becoming damaged.

The dished knife 27 is driven by the electric motor 28 through the spindle 29, and is set in a plane parallel to the gauge plate 31, and the guard plate 30 is set at a slight angle to the planes of the gauge plate 31 and the knife edge, inclining from inside the dish of the knife at the approach side, out past the cutting edge at the opposite side so that the meat recedes as the cut is being made. The guard plate 30 is supported on the support 32 which is rigidly secured to the base 8. On the upper portion of the guard plate 30 are thumb screws 33 provided so that the guard plate can be removed by removing the thumb screws and removing the guard plate from its support 32 so that the knife can be cleaned or removed. The scraper 34, secured to the support 32, bears against the edge of the knife 27 keeping it clean. A crumb tray 35 is formed by the juncture of the support 32 with the base 8, so that scraps from the knife will be caught therein. A food receiving pan 36 seats on the base 8 and lies just under the knife 27. A deflector plate 38 is secured to the housing for the spindle and serves the dual purpose of providing a cover for the knife and a deflector for the food so that when a cut is made it throws it into the pan 36. A suitable guard 39 is secured to the spindle housing at one end and to its other end is secured the guard plate 30 by means of thumb screws 33. Any suitable grinding device 40 may be provided in this cover 39 so that the knife 27 can be sharpened as desired.

While the invention has been described above in its preferred form, it will be obvious that various changes and modifications may be made therein without departing from the spirit or scope thereof and it is therefore desired that only such limitations may be imposed thereon as are necessitated by the prior art or specifically set forth in the appended claims.

Having thus described my invention, what I claim as new and desire to secure by Letters Patent, is:—

1. A slicer having in combination a rotary knife revolving on a fixed axis, a guard plate for said knife, a gauge plate adjacent said knife, and a flat platen extending along the length of both the gauge plate and guard plate, said platen being hinged to swing away from the gauge plate and guard plate.

2. A slicer having in combination a rotary knife revolving on a fixed axis, a guard plate for said knife, a gauge plate adjacent said knife, a flat platen extending along the length of both the gauge plate and guard plate, said platen being hinged to swing away from the gauge plate and guard plate, and hinged means for gripping the material to be sliced, said gripping means being movable in a plane parallel to the path of travel of said material.

3. A slicer having a fixed guide for the material to be sliced, a gauge plate and a guard plate succeeding longitudinally of and forming one side of the guide, with their adjacent ends spaced apart, a rotary disc-shaped knife with its cutting edge extending into said guide between said plates, a rod along the upper edge of the other side of the guide, a link pivoted on and slidable along said rod, and a gripper having an extension pivoted to said link, whereby said gripper may be swung with said link or slid along with said link, to approach or recede from said plates and knife for feeding material into the cutting plane of the knife, and to feed said material along said plane to be sliced by the knife.

4. A slicer having an elongated guide with sides at a substantial angle to each other in its cross sectional plane, one side having an opening, a cutter having a cuting edge extending into the guide through said opening, a member having means to grip material, and a mounting for said member, slidable along the guide and comprising a plurality of sections with pivotal connections on axes parallel with the direction of sliding.

5. A slicer having an elongated guide with sides at a substantial angle to each other in its cross sectional plane, one side having an opening, a cutter having a cutting edge extending into the guide through said opening, a member having means to grip material, and a mounting for said member comprising a handle fixed to the member, a link pivoted to the handle on an axis parallel with the length of the guide, and a guide for the link, parallel with the length of the guide, said link pivotally connected with the guide on an axis parallel with its other pivotal connection and with said guide.

6. A slicer having an elongated guide with sides at a substantial angle to each other in its cross sectional plane, one side having an opening, a cutter having a cutting edge extending into the guide through said opening, a member comprising means to grip the material, and a mounting for said member comprising a handle, a link and a guide extending longitudinally of said elongated guide, said link having pivotal connections to said handle and to said guide, on axes parallel with said guide, and a stop at one of said pivotal connections, limiting swinging of said member to hold the handle up from said elongated guide.

ELMER G. STRECKFUSS.